United States Patent
Kelley

(10) Patent No.: US 7,148,692 B2
(45) Date of Patent: Dec. 12, 2006

(54) DETECTOR FOR NON-FERROUS METALS WITH REDUCED FALSE POSITIVE RESPONSES

(75) Inventor: Anne Kelley, Corvallis, OR (US)

(73) Assignee: White's Electronics, Inc., Sweet Home, OR (US)

( * ) Notice: Subject to any disclaimer, the term of this patent is extended or adjusted under 35 U.S.C. 154(b) by 0 days.

(21) Appl. No.: 10/969,726

(22) Filed: Oct. 20, 2004

(65) Prior Publication Data

US 2006/0082373 A1    Apr. 20, 2006

(51) Int. Cl.
*G01V 3/08* (2006.01)
*G01V 3/10* (2006.01)

(52) U.S. Cl. ........................ 324/329; 324/239

(58) Field of Classification Search ........ 324/326–329, 324/233, 239

See application file for complete search history.

(56) References Cited

U.S. PATENT DOCUMENTS

| | | | |
|---|---|---|---|
| 4,110,679 A | | 8/1978 | Payne |
| 4,128,803 A | * | 12/1978 | Payne ........................ 324/329 |
| 4,507,612 A | | 3/1985 | Payne |
| 4,677,384 A | | 6/1987 | Payne |
| 4,700,139 A | | 10/1987 | Podhrasky |
| 5,148,151 A | | 9/1992 | Podhrasky |
| 5,506,506 A | | 4/1996 | Candy |
| 5,642,050 A | | 6/1997 | Shoemaker |
| 6,326,791 B1 | | 12/2001 | Bosnar |
| 6,421,621 B1 | | 7/2002 | Earle |
| 6,541,966 B1 | | 4/2003 | Keene |
| 6,583,625 B1 | | 6/2003 | Castle |
| 6,911,823 B1 | * | 6/2005 | Rowan ........................ 324/326 |
| 2003/0160617 A1 | | 8/2003 | Rowan |

* cited by examiner

*Primary Examiner*—Reena Aurora
(74) *Attorney, Agent, or Firm*—Birdwell & Janke, LLP

(57) ABSTRACT

A metal detector for detecting objects that are composed of non-ferrous metals. The metal detector provides for a reduced rate of false positive responses to objects composed of ferrous metals. A preferred metal detector according to the invention includes a transmitter for transmitting a time-varying electromagnetic signal and a receiver for receiving a responsive time-varying electromagnetic signal produced by the metal object. The metal detector also includes an analyzer for determining the resistive and reactive components of the responsive signal as respective first and second functions of the spatial position of the detector. A module for determining and comparing rates of change of the first and second functions at one or more spatial positions is included. Preferably, when the rates of change are the first derivatives or slopes of the functions, and when these are of the same sign, a result indicating that the metal object is non-ferrous is provided by the module.

A preferred method for identifying with an improved degree of reliability a non-ferrous metal object versus a ferrous object. The resistive and the reactive components of the responsive electromagnetic signal are determined as respective first and second functions of the spatial position of the detector, and the rates of change of the first and second functions at one or more spatial positions are compared. Preferably, if the rates of changes are the first derivatives or slopes of the functions, and these are of the same sign, a result that the object is non-ferrous is provided.

22 Claims, 2 Drawing Sheets

DETECTOR FOR NON-FERROUS METALS WITH REDUCED FALSE POSITIVE RESPONSES

SIGNAL OF THE INVENTION

The invention relates to a metal detector that provides information about the metal of composition of an object.

BACKGROUND

Metal detectors are used in a variety of applications, ranging from military and security uses such as detecting firearms or landmines to hobby uses such as searching for lost jewelry, coins, artifacts and other metal objects. When searching for buried metal objects, the searcher often must dig up the object for identification once it has been detected by the metal detector. If the object is not of particular interest, the searcher has needlessly invested the time and effort to dig up the object. In addition, needless damage is done to the terrain.

Especially for hobby users of metal detectors, ferrous metal objects, that is, objects made largely of iron or steel, are generally of less interest than are non-ferrous metal objects. Ferrous metal objects include items of little value or interest such as nails, staples, scrap iron, "tin" cans, steel parts of abandoned automobiles, or construction debris such as flashing. In contrast, non-ferrous metal objects tend to be of greater interest, although there are exceptions such as aluminum foil and pulltabs. Desirable objects for hobbyists include coins, composed of metals such as gold, silver, nickel or copper; jewelry made of gold, platinum or silver; bronze or brass artifacts such as antique cannons or ship's bells; or copper sheeting or wire which may be sold for salvage. The greater desirability of these types of objects may be due to their higher monetary value, their historical interest, or their physical attractiveness. Therefore metal detectors with improved operational features for identification of the composition of metal objects are desired by users.

There are two fundamentally different types of metal detectors generally in use at the present time, continuous wave and pulse types. The principle of operation of metal detectors of the continuous wave type involves the production and transmission of a substantially continuous time-varying, or alternating, electromagnetic signal which may consist of a single frequency or may have multiple frequency components, and the concurrent detection of a responsive time-varying electromagnetic signal that is induced by the transmitted electromagnetic signal in metal objects that are located near the detector. The pulse type detector emits brief bursts of electromagnetic radiation then detects a responsive signal from the metal object after the transmitted pulse ends.

Metal detectors may obtain information about the composition of metal objects by making use of the differing responses of various metal elements and alloys to the transmitted electromagnetic signal. Different metal substances, due to their diverse physical properties, cause different degrees of delay in the phase of the responsive electromagnetic signal, which may be determined by the detector using circuitry adapted for the purpose.

Various types of metals each have, at least to some extent, characteristic ranges of phase delays, although the phase delay as determined may also be affected by variables other than the material of composition such as shape and size of the object. While identification of the material composing a metal object does not unambiguously define what the object is, it does allow for objects unlikely to be of interest to be rejected and others to be identified as more likely of being worthy of recovery.

In the continuous wave type metal detector, analysis of a received signal is performed in the frequency domain. The phase delay angle of the received signal, relative to the transmitted signal or to a standard, consists of two electromagnetic components referred to as a resistive component and a reactive component. These two components are mathematically orthogonal, being disposed in a vector relationship at 90 degrees ($\pi/2$ radians) to each other. These two components sum by vector addition to yield the vector that expresses the angle of phase delay, therefore, the ratio of the two vectors expressing the magnitudes of the resistive and reactive components is equal to the arctangent of the phase delay angle. In the metal detector signal, it is traditional to assign the resistive value to the Y-axis and the reactive value to the X-axis when plotting the phase angle on Cartesian coordinates, so the phase delay angle is equal to the arctangent of resistive component magnitude divided by reactive component magnitude.

Thus, ferrous and non-ferrous metals produce responsive electromagnetic signals with differing characteristic properties of the resistive and reactive components which may be detected and used to provide the operator of the metal detector with information about the composition of a detected object. A characteristic of ferrous objects is to produce signals in response to the interrogating electromagnetic signal in which the polarities of the resistive and reactive components are opposite, while non-ferrous objects produce signals in which the polarities of the resistive and reactive components are the same. Furthermore, the magnitudes, i.e. the absolute values as well as the polarities, of the resistive and reactive components tend to have characteristic ranges for metals of a given type. It is known for metal detectors to use information of this type to characterize the type of metal composing a detected object.

The characterization can be used in different ways, for instance by reporting all metal objects along with information about their possible composition, or alternatively by only reporting metal objects whose composition has been pre-selected as being of a desirable type, or by providing a different type of indication for different compositions. The decisions as to how the detector will respond, and what types of metal compositions it will report to the user, may be made by the detector manufacturer and be preset at the factory, or alternatively the user may select and set criteria that define what phase delay angle values or ranges the metal detector will report or not report.

For example, U.S. Pat. No. 4,700,139 describes a metal detector that allows the user to electronically define a single excluded region of phase delay within which a target will not be reported, while targets whose phase delays, i.e., whose ratio of resistive and reactive components, are outside the excluded region are reported. U.S. Pat. No. 5,148,151 describes a detector into which the user can pre-program criteria for all regions of the phase delay scale that govern whether a detected object is reported (accepted) or not reported (rejected). U.S. Pat. No. 4,677,384 provides a discriminate circuit enabling the reporting of an object whose responsive electromagnetic signal falls within a certain narrow angle range of phase delay lying within a broader range of phase delay angles that would normally not be reported.

Despite this capability, in some cases the determination made by the metal detector about the material of composition of the detected object based on the phase delay angle can be incorrect. When a detector is preset to report only non-ferrous objects but then mistakenly reports a ferrous object, the user is mistakenly induced to expend time and effort digging up or otherwise securing the detected object only to find that it is not of the composition expected. Therefore, features that increase the accuracy and reliability of the identification of the metal of composition of an object made by the detector are desirable to users.

Accordingly, there is a need for an improved method and apparatus for detection of metal objects of non-ferrous composition with a reduced rate of false positive reports.

SUMMARY

The present invention provides a metal detector for detecting objects that are composed of non-ferrous metals. The metal detector provides for a reduced rate of false positive responses to objects composed of ferrous metals. A preferred metal detector according to the invention includes a transmitter for transmitting a time-varying electromagnetic signal and a receiver for receiving a responsive time-varying electromagnetic signal produced by the metal object. The metal detector also includes an analyzer for determining the resistive and reactive components of the responsive signal as respective first and second functions of the spatial position of the detector. A module for determining and comparing rates of change of the first and second functions at one or more spatial positions is included. Preferably, when the rates of change are the first derivatives or slopes of the functions, and when these are of the same sign, a result indicating that the metal object is non-ferrous is provided by the module.

A preferred method for identifying with an improved degree of reliability a non-ferrous metal object versus a ferrous object comprises transmitting a time-varying electromagnetic signal and receiving from the metal object a responsive time-varying electromagnetic signal. The resistive and the reactive components of the responsive electromagnetic signal are determined as respective first and second functions of the spatial position of the detector, and the rates of change of the first and second functions at one or more spatial positions are compared. Preferably, if the rates of changes are the first derivatives or slopes of the functions, and these are of the same sign, a result that the object is non-ferrous is provided.

It is to be understood that this summary is provided as a means of generally determining what follows in the drawings and detailed description, and is not intended to limit the scope thereof. Moreover, the objects, features and advantages of the preferred embodiments will be more readily understood upon consideration of the following detailed description taken in conjunction with the accompanying drawings.

DETAILED DESCRIPTION OF A PREFERRED EMBODIMENT

It is an outstanding feature of a metal detector of the present invention to obtain and use information about changes in the resistive and reactive components of a responsive electromagnetic signal produced by a metal object as a function of the relative spatial relationship of the object and the detector. The responsive signal is produced by the metal object in response to an interrogating electromagnetic signal generated by the detector. A purpose of obtaining and processing this information is to assist in determining whether the metal object is of ferrous or non-ferrous composition.

Figure 1:
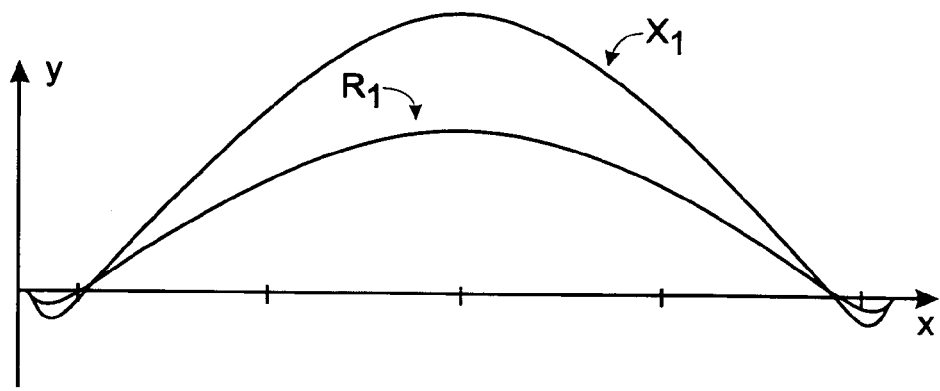
FIG. 1 is a graphical depiction of changes in the resistive and reactive components of the responsive electromagnetic signal produced by a non-ferrous metal object as a continuous wave type metal detector is swept over a metallic object.

FIG. 1 is a graphical representation of typical changes in the resistive and reactive components of a responsive electromagnetic signal produced by a non-ferrous metal object as a metal detector transmitting a substantially continuous time-varying interrogating electromagnetic signal is moved over the object. This motion typically produced by a user of the detector sweeping the detector from side to side while moving about.

The changes in the magnitudes of the resistive and reactive components of the responsive signal are shown in FIG. 1 as respective functions dependent on detector position. The x-axis represents the spatial position of the detector. However, it should be understood that where the detector is moving, position can be related to time. In addition, it should be understood that it is not generally essential for purposes herein to know the velocity of the detector, or even to keep it constant to compare magnitudes of and changes in the resistive and reactive component functions. Thus, the resistive and reactive components are referred to generally herein as functions of spatial position or simply "position."

The y-axis represents the magnitude of the resistive component $R_1$ or the reactive component $X_1$. As is evident, both resistive and reactive components are of the same polarity (here positive) across most of the range of spatial positions sampled. This is known to be a characteristic of a non-ferrous metal object.

FIG. 1 also shows that at any given point on the x-axis the rates of change characterized by the slopes or first derivatives of the two functions, as obtained by differentiating the functions with respect to position, at that point have the same sign, i.e., when one of the functions is increasing the other is also increasing so the slopes are both of positive sign, and when one of the functions is decreasing so is the other thus the slopes are both of negative sign.

Figure 2:
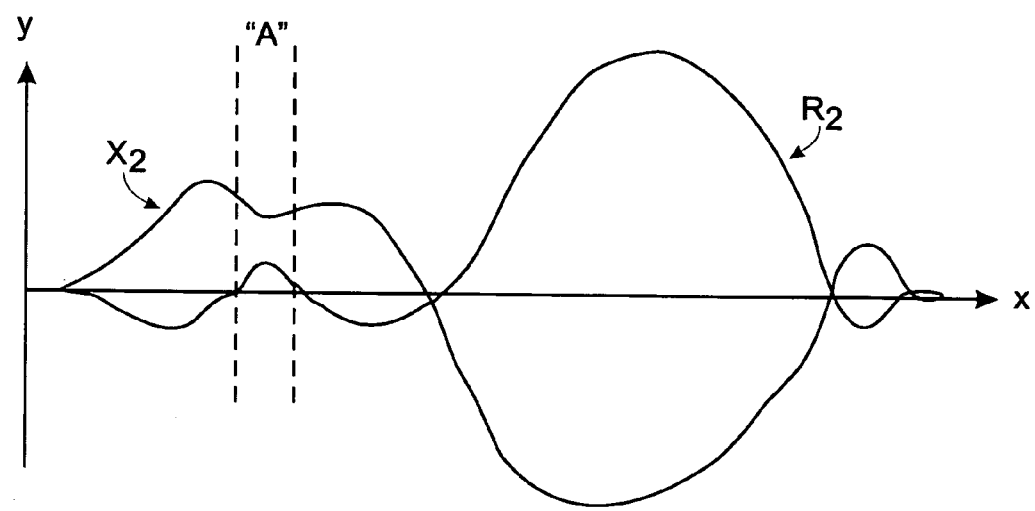
FIG. 2 is a graphical depiction of changes in the resistive and reactive components of the responsive electromagnetic signal produced by a type of ferrous metal object subject to being misidentified as non-ferrous as a continuous wave type metal detector is swept over a metallic object.

FIG. 2 illustrates an example of the variations of the resistive and reactive functions versus relative position that may be exhibited by a ferrous metal object. Again, the relative position of the detector and the object is plotted on the x-axis and the magnitudes of the resistive component $R_2$ and the reactive component $X_2$ are plotted on the y-axis. Over most of the range where a responsive electromagnetic signal is detected, the polarities of the resistive and reactive components for a ferrous object are opposite.

By contrast to the non-ferrous object of FIG. 1, for the ferrous object particularly the reactive component $X_2$ is negative over much of the spatial range. This is known to be characteristic of ferrous objects. However, as is shown in FIG. 2, some ferrous objects having an irregular shape within some range of spatial positions can also produce a responsive signal wherein the polarities of the resistive and reactive components are the same. For example, an iron nail having a large head, i.e., with a highly asymmetric distribution of mass, may produce this effect over a region, designated as region "A," of the overall spatial range as shown in FIG. 2.

A prior art metal detector characterizing the object based on the polarities of the two components in the region A could falsely identify the object as non-ferrous when it is actually ferrous. Thus, while the majority of ferrous objects may be correctly identified by prior art detectors that base their determination of the material of composition on the polarities of the two components, in these detectors some ferrous objects such as that whose response is shown in FIG. 2 may yield a false identification as being non-ferrous. This will typically result in the needless expenditure of effort by the user to recover the undesired type of object.

To avoid making this false positive identification, the present invention makes use of a recognition that the slopes of the two functions in FIG. 2 are almost everywhere of opposite signs. Even in region A where both components' polarities are the same, and even though at certain spatial positions the slopes of the two functions may be of the same sign, overall they can be seen to be of opposite signs, as is made evident by summing or integrating the results of the comparison of the signs of the slopes at multiple spatial positions across the region A. This contrasts with the situation in FIG. 1 for the non-ferrous object, where the slopes of the two functions at virtually every spatial position have the same signs as each other. By determining and examining the slopes of the functions R and X, a metal object that exhibits a response similar to that of the ferrous object in FIG. 2 can now in accordance with the present invention be correctly identified as being of ferrous composition.

Figure 3:
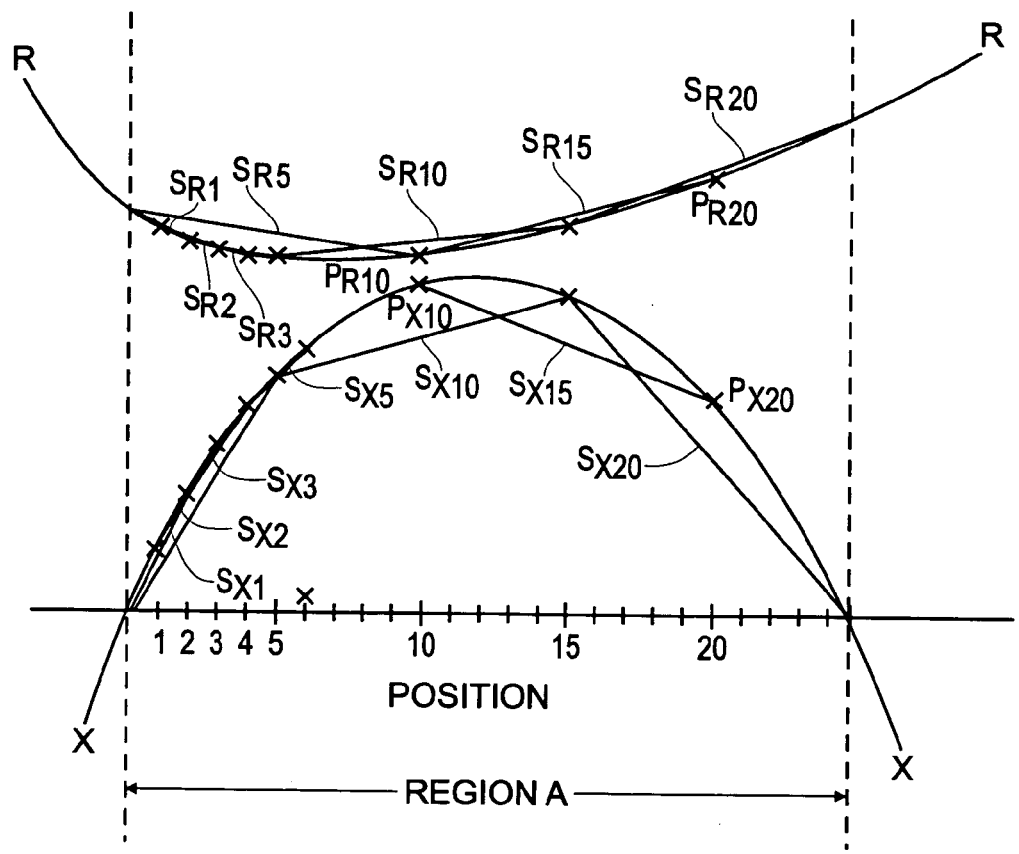
FIG. 3 is a graphical depiction of calculations carried out by a preferred embodiment of the present invention in determining and comparing changes in the resistive and reactive functions of the responsive electromagnetic signal as a function of detector position.

FIG. 3 shows in greater detail the region A of FIG. 2. The axes are defined in the same manner as in FIG. 2. FIG. 3 illustrates how a preferred embodiment of the present invention carries out a determination and comparison of rates of change of the functions of the resistive and reactive components shown in region A of FIG. 2 to yield the correct result that the object of FIG. 2 is in fact of ferrous composition.

To reduce or eliminate potential ambiguity in the region A according to the present invention, determinations of the slopes of functions R and X respectively are made within the region A for at least a single spatial position. According to the present invention, the rate of change of a function is preferably the slope or first derivative of the function, but a second or higher order derivative could also be used without departing from the principles of the invention.

The slope of a function may be determined by any appropriate method. For example, as shown in FIG. 3, the rates of change of the two functions R and X at the position 15 are the slopes $S_{R15}$ and $S_{X15}$ which are an approximation of the mathematical first derivatives of the two functions. One exemplary method of determining a slope, as is shown in FIG. 3 in deriving $S_{R15}$ and $S_{X15}$, is to draw a line segment through two points of the function associated with the selected spatial position and calculate the slope of the line. Another method is to use circuitry that differentiates the function. One version of the former method will be described herein, it being understood that any equivalent method may be used without departing from the principles of the invention. Furthermore, it is understood that higher order derivatives, such as second or even third derivatives, may also be of use in this regard.

To exemplify the application of a preferred method employing the slopes, for the spatial position 15 in the plot of FIG. 3 the slope of the function X is determined by drawing a line through $P_{X10}$ and $P_{X20}$, which are two points on the function X corresponding to spatial positions 10 and 20, spatial position 15 falling therebetween. The slope of any such line segment is either positive, negative, or zero. The slope of the particular line segment $S_{X15}$ defined through points $P_{X10}$ and $P_{X20}$ is seen as being negative. An adjacent line segment $S_{X10}$ is positive. A line segment could be found that has a zero slope, but this result is unlikely as a practical matter.

Also for the spatial position 15, the slope of the function R can be determined by drawing a line through $P_{R10}$ and $P_{R20}$, which are two points on the function R corresponding to spatial positions 10 and 20. The slope of the line segment $S_{R15}$ defined by these points is seen to be positive. Therefore, even though the magnitudes of the functions R and X have the same polarity, which would have led a prior art metal detector to falsely indicate that the object is non-ferrous, the pair of slopes $S_{X15}$ and $S_{R15}$ are of opposite signs, indicating correctly according to the present invention that the object is ferrous.

It is generally possible that the slopes of the two functions at a given spatial position within a region such as the region A will have the same signs, for example the pair of slopes $S_{X10}$ and $S_{R10}$. To eliminate any possibility of ambiguity according to a preferred embodiment of the invention, a number of pairs of slopes are preferably compared and the result summed or integrated as indicated above. Providing more samples of the slopes, i.e., providing a finer resolution or granularity, also produces a more accurate characterization of the functions for which the slopes are being determined.

Summing a number of pair-wise slope comparisons can be implemented in a number of different ways. A simple implementation is to sum the comparisons, i.e., for a comparison determining that the slopes have the same sign, a value can be assigned to the comparison, and for a comparison determining that the slopes have a different sign, another value can be assigned to the comparison. For example, a value of +1 can be assigned where slopes are of equal sign (either both positive or both negative) and a value of −1 can be assigned where the slopes are of different sign (either one negative and the other positive or zero, or one positive and the other negative or zero). Then, a simple counter can be used to count up for each spatial position for which the slopes are both of the same sign and count down for each spatial position for which the slopes are of differing signs. If at the end of the count the count is negative, then overall the slopes are of differing signs, while if the count is positive, then overall the slopes are of the same sign and it can be concluded with an enhanced degree of reliability that the object is non-ferrous.

For example, if slopes are determined at every 5 position units such as for positions 5, 10, 15, and 20, slopes $S_{X5}$, $S_{X10}$, $S_{X15}$, and $S_{X20}$ of portions of the X curve approximate the actual X curve more crudely than if slopes are determined for every single position unit, as shown by slopes $S_{X1}$, $S_{X2}$, $S_{X3}$. Comparisons of slopes $S_{R5}$ and $S_{X5}$, $S_{R15}$ and $S_{X15}$, and $S_{X20}$ and $S_{X20}$ reveal that these three pairs of slopes are of opposite signs, although $S_{R10}$ and $S_{X10}$ are of the same sign. Carrying out a summing function as described above would yield the result that the slopes are on average of opposite sign, even though they are of the same sign at one position.

Based on these data, the preferred embodiment detector would correctly conclude that the detected object is ferrous, as the preferred criteria for a non-ferrous object are not met; namely that the slopes of the functions be predominantly of the same sign over the spatial region where the polarities are both positive.

The fact that the correct result is obtained more frequently using the preferred embodiment over a prior art detector becomes even more striking as the sampling rate of the preferred detector increases and the spacing of the positions decreases. It is apparent that as the spacing of the positions decreases, the accuracy of the determination made by the preferred detector increases. Examining the results of slope determination and comparison at every unit spatial position, it is apparent that the slopes $S_{R1, R2, R3 \ldots}$ and $S_{X1, S2, X3 \ldots}$ that are obtained for each unit position more closely follow the actual shapes of the functions R and X. Comparison of the signs of each pair of slopes and summation of the results of the comparisons overwhelmingly demonstrates that the slopes are predominantly of opposite signs over the region where the polarities of the components are both positive. Here also a correct result is achieved; the object is of ferrous composition.

Thus, in accordance with the present invention the frequency of false positive responses in detectors adapted to distinguish ferrous from non-ferrous metal objects is diminished. In the example of FIG. 3, even when the slopes are determined and compared at only one position in the region of space where both components' polarities are positive, for instance randomly using one of the five-unit sampling positions, three out of four times the slopes would be found to be of opposite signs and the correct result obtained. When the slopes are determined at every five position units and the results summed, the correct result is arrived at, as the slopes are seen to be, overall, of opposite sign.

The curves of the magnitudes of the R and X components may assume different shapes over the region of positive polarities for different objects. When the functions vary quickly in relation to the sample interval, the error rate may be higher. Persons of ordinary skill will recognize that any desired tolerance can be provided by adjusting the sampling rate.

Figure 4:
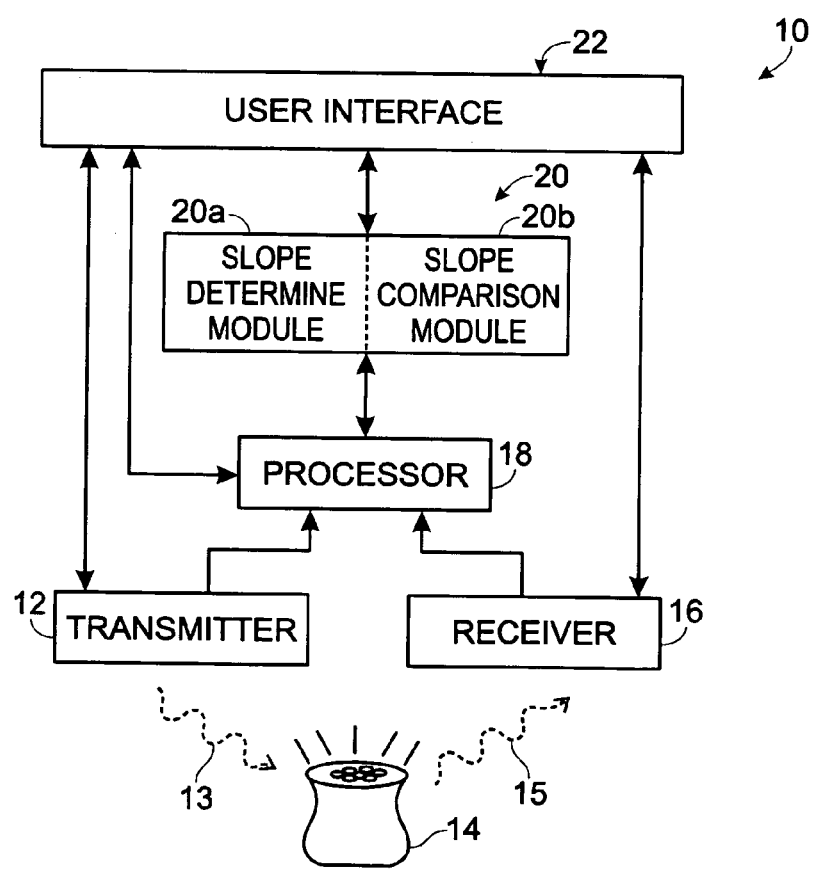
FIG. 4 is a block diagram of a preferred embodiment of a continuous wave type metal detector according to the present invention.

FIG. 4 shows a preferred embodiment 10 of a metal detector according to the present invention and implementing the aforedescribed method. The metal detector 10 has a transmitter 12 that produces an interrogating signal 13, typically by means of a transmitter coil through which an alternating electrical current generated by the transmitter circuitry flows. The interrogating signal may have multiple sinusoidal frequency components such as would be provided by a square or rectangular wave, however, for purposes of description herein only one sinusoidal frequency component is analyzed, it being understood that the analysis would be similar for additional frequency components.

The interrogating signal 13 generated by the transmitter 12 permeates nearby space including air, solid ground, water, or most other media as might be found in the environment. The interrogating signal induces in a metal object an electrical current that in turn generates a responsive signal in a receiver 16 which typically includes a coil, which may be the same coil as is used for transmission.

While theoretically this responsive signal is generated even at very low intensities of the interrogating signal such as are present some distance from the transmitter, in practical terms the responsive signal becomes of interest only when it is of sufficient intensity to generate in the receiver 16 a signal of a strength that is detectable above the noise level. This happens when the object is in fairly close physical proximity to the metal detector, typically in the range of a meter or less.

The receiver 16 typically further comprises circuitry that amplifies the received signal and applies filtering techniques. The received signal can be digitized and processed by digital circuitry, or may remain in analog form.

During typical operation of the detector the receiver is "ground-balanced" as is standard in the art to eliminate contributions to the received signal from the ground in which the object resides. This serves to keep the ground response from overwhelming the response generated by the object.

In the preferred embodiment 10, the signal from the receiver 16 is then provided to a processor 18, wherein the resistive and reactive components of the responsive electromagnetic signal are determined. As described above, the resistive and reactive components may by vector addition provide phase delay angle information to a user interface 22.

The processor 18 is preferably adapted to provide the standard comparison of the polarities of the magnitudes R and X, and to proceed to compare slopes only in a region of positive polarities, where the possibility that the object is non-ferrous cannot definitely be excluded. However, this is not essential to the invention.

To perform a slope comparison according to the present invention, the detector 10 includes a slope acquisition module 20a and comparator module 20b which are preferably implemented in software executed by the processor 18 but which may be implemented in hardware or any combination of hardware and software. The two modules preferably may be combined in a single slope acquisition and comparator module 20.

The slope acquisition module 20a acquires the slope of each of the functions R and X at a given spatial position P of the detector 10. In a preferred embodiment of the invention, the module 20a does this by acquiring the magnitude of the functions at two points on either side of the spatial position P and determining the slopes of the line defined thereby. However other methods for determining the slopes or first derivatives of the functions may be employed as known in the art, such as analog or digital filtering.

After the slopes of the R and X component functions are acquired, the comparator module 20b compares the signs of the slopes, i.e. determining whether they are both positive or both negative or have opposite signs. Where a slope is zero, it may be considered positive, or negative, or it may be disregarded.

The slope acquisition and comparator module 20 is further adapted to produce an indication signal S that indicates whether the slopes are of the same sign or not. This indication S may either be communicated immediately to the user via the user interface 22, or preferably may be stored in some manner such that multiple such determinations can be made and summed or averaged over a range of spatial positions.

Preferably, the comparison of the signs of the pair of slopes may be made multiple times at different spatial positions, preferably throughout the region of positive polarities of both functions R and X. Preferably this operation is carried out in real time as the detector is swept over the object.

Preferably, the slope acquisition module 20a and comparator module 20b comprise a summing or averaging function, for instance such as may be carried out by a counter which increments a value every time the pair of slopes are of the same sign and decrements the value every time the pair of slopes are not of the same sign. This counting operation is preferably carried out in real time, thereby creating a running total that indicates the overall trend of the slope sign comparisons as the detector is being swept over the metal object. Each time a comparison is performed, the counter is updated to reflect the latest contribution to the overall trend. The counter result may indicate not just whether the trend is for slopes of the same sign or slopes of opposite signs, but how strong the trend is. For example, as described above if the value +1 is used each time the slopes are found to be of the same sign and −1 is used every time the slopes are found to be of opposite signs, the summed result indicates not just the overall trend of slope sign comparisons, but how strongly they trend in a given direction. A higher positive value would indicate a responsive signal wherein the slopes are more frequently found to be the same than would a lower but still positive value.

How frequently the slope sign comparisons are made as the detector is swept over the object, and thus how many comparisons will be summed or averaged to produce a result, is a variable that may either be preset in the detector during manufacture or by the user. The counter may operate on a digital basis, providing a number as a result, or alternatively may operate on an analog basis, wherein the result is a voltage.

The detector may signal the user that a non-ferrous object has been detected based on a variety of different criteria that may either be preset or user-determined. For instance, the detector could provide an indicating signal the first time a slope comparison is made and the slopes are found to be of the same sign, preferably within the region of positive polarities of both functions R and X. Alternatively, the detector could provide an indicating signal when the above-mentioned counter, which is incremented when slopes are of the same sign and decremented when the slopes are of opposite signs, reached a previously set value. Alternatively the detector could provide an indicating signal when the detector had moved spatially beyond the region of positive polarities, if the value of the sum of the slopes' comparisons at that time were a positive number. Numerous other modes for using the slope comparison data as an indicating signal will be readily apparent to those of ordinary skill in the art.

As described above, the detector typically comprises a transmitter and a receiver in the same housing, so that moving the transmitter relative to the object also moves the receiver. However, without departing from the principles of the present invention, the transmitter and the receiver may be housed separately from each other such that one is moved relative to the object while the other is not. Moreover, multiple instances of the transmitter 12 or the receiver 16 may be spaced apart over the ground and activated sequentially to determine the resistive and reactive component functions without any physical motion of the detector, without departing from the principles of the present invention.

It is understood that while a preferred embodiment of the present invention is a continuous wave type metal detector, the principles of the invention may be applied to a pulse type metal detector where a resistive and reactive component of the responsive signal can be deduced, such as by the use of a Fourier transform.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A metal detector, comprising:
   a transmitter for transmitting a time-varying electromagnetic signal to an object:
   a receiver for receiving a responsive signal produced by the object;
   an analyzer for resolving said responsive signal into resistive and reactive components defining first and second functions, respectively, of the spatial position of the metal detector; and
   a module for acquiring information that represents first and second changes, respectively, in said first and second functions resulting from a change in said position, and comparing said first and second changes.

2. The apparatus of claim 1, wherein said information includes the slopes of said first and second functions corresponding to a selected position and wherein said comparing includes comparing at least the signs of said slopes.

3. The apparatus of claim 2, wherein said analyzer is adapted for indicating that the object is substantially of non-ferrous composition if said slopes have the same sign.

4. The apparatus of claim 2, wherein said first and second functions include at least two points associated with the selected position, wherein said module is adapted to acquire said slopes at least in part by determining the respective differences of the values of said first and second functions at said two points.

5. The apparatus of claim 2, wherein said first and second functions are substantially continuous, wherein said module is adapted to acquire said slopes at least in part by differentiating said first and second functions.

6. The method of claim 2, wherein said first and second functions include at least two points associated with the selected position, the method further comprising acquiring said slopes at least in part by determining the respective differences of the values of said first and second functions at said two points.

7. The apparatus of claim 1, wherein said module is adapted for acquiring slopes of said first and second functions corresponding to a selected position where said analyzer determines said first and second functions to have positive polarity, and comparing said slopes, and wherein said analyzer is adapted for indicating that the object is substantially of non-ferrous composition if said slopes have the same sign.

8. The apparatus of claim 1, wherein said module is adapted for acquiring slopes of said first and second functions corresponding to a plurality of different spatial positions of the metal detector and comparing said slopes at each of said plurality of positions, said analyzer further adapted for determining the difference in (a) the number of said plurality of positions corresponding to which said slopes have the same sign and (b) the number of said plurality of positions corresponding to which the slopes of said first and second functions have the opposite sign, and indicating that the object is substantially of non-ferrous composition if said number (a) exceeds said number (b).

9. The apparatus of claim 8, wherein said first and second functions include at least two points associated with each of said plurality of positions, wherein said module is adapted to acquire said slopes at least in part by determining, for each of said plurality of positions, the respective differences of the values of said first and second functions at the associated points.

10. The apparatus of claim 8, wherein said first and second functions are substantially continuous, wherein said module is adapted to acquire said slopes at least in part by differentiating said first and second functions.

11. The apparatus of claim 1 wherein said module is adapted for acquiring slopes of said first and second functions corresponding to a plurality of different spatial positions of the metal detector for which said analyzer determines said first and second functions to have positive polarity, and comparing said slopes at each of said plurality of positions, said analyzer further adapted for determining the difference in (a) the number of said plurality of positions corresponding to which said slopes have the same sign and (b) the number of said plurality of positions corresponding to which the slopes of said first and second functions have the opposite sign, and indicating that the object is substantially of non-ferrous composition if said number (a) exceeds said number (b).

12. The apparatus of claim 1, wherein said module is further adapted for determining whether the object is substantially of non-ferrous composition based on said comparing.

13. A method for operation of a metal detector, comprising:
transmitting a time-varying electromagnetic signal to an object;
receiving a responsive signal produced by the object;
resolving said responsive signal into resistive and reactive components defining first and second functions, respectively, of the spatial position of the metal detector; and
acquiring information that represents first and second changes, respectively, in said first and second functions resulting from a change in said position, and comparing said first and second changes.

14. The method of claim 13, wherein said information includes the slopes of said first and second functions corresponding to a selected position and wherein said step of comparing includes comparing at least the signs of said slopes.

15. The method of claim 14, further comprising indicating that the object is substantially of non-ferrous composition if said slopes have the same sign.

16. The method of claim 14, further comprising selecting the selected position including determining that the polarities of said first and second functions at the selected position are positive, and indicating that the object is substantially of non-ferrous composition if said slopes have the same sign.

17. The method of claim 14, wherein said first and second functions are substantially continuous, the method further comprising acquiring said slopes at least in part by differentiating said first and second functions.

18. The method of claim 13, comprising acquiring slopes of said first and second functions at a plurality of different spatial positions of the metal detector, comparing said slopes at each of said plurality of positions, determining the difference in (a) the number of said plurality of positions corresponding to which said slopes have the same sign and (b) the number of said plurality of positions corresponding to which the slopes of said first and second functions have the opposite sign, and indicating that the object is substantially of non-ferrous composition if said number (a) exceeds said number (b).

19. The method of claim 18, wherein said first and second functions include at least two points associated with each of said plurality of positions, the method further comprising acquiring said slopes at least in part by determining, for each of said plurality of positions, the respective differences of the values of said first and second functions at the associated points.

20. The method of claim 18, wherein said first and second functions are substantially continuous, the method further comprising acquiring said slopes at least in part by differentiating said first and second functions.

21. The method of claim 13, further comprising comprising determining a plurality of different spatial positions at which the polarities of said first and second functions are positive, acquiring slopes of said first and second functions corresponding to said plurality of positions, comparing said slopes at said plurality of positions, determining the difference in (a) the number of said plurality of positions corresponding to which said slopes have the same sign and (b) the number of said plurality of positions corresponding to which the slopes of said first and second functions have the opposite sign, and indicating that the object is substantially of non-ferrous composition if said number (a) exceeds said number (b).

22. The method of claim 13, further comprising determining whether the object is substantially of non-ferrous composition based on said comparing.

* * * * *